(12) United States Patent
Caimi

(10) Patent No.: US 9,613,609 B2
(45) Date of Patent: Apr. 4, 2017

(54) SOUND-ABSORBING PANEL AND ASSOCIATED MANUFACTURING METHOD

(71) Applicant: ELEDA S.R.L., Milan (IT)

(72) Inventor: Renato Caimi, Milan (IT)

(73) Assignee: ELEDA S.R.L., Milan (IT)

(*) Notice: Subject to any disclaimer, the term of this patent is extended or adjusted under 35 U.S.C. 154(b) by 79 days.

(21) Appl. No.: 14/374,754

(22) PCT Filed: Jan. 31, 2013

(86) PCT No.: PCT/EP2013/051872
§ 371 (c)(1),
(2) Date: Jul. 25, 2014

(87) PCT Pub. No.: WO2013/113800
PCT Pub. Date: Aug. 8, 2013

(65) Prior Publication Data
US 2015/0008070 A1    Jan. 8, 2015

(30) Foreign Application Priority Data

Feb. 3, 2012   (IT) .............................. MI2012A0148

(51) Int. Cl.
*E04B 1/84*       (2006.01)
*E04B 9/04*       (2006.01)
(Continued)

(52) U.S. Cl.
CPC ............ *G10K 11/168* (2013.01); *B32B 37/12* (2013.01); *B32B 37/1284* (2013.01); *E04B 1/86* (2013.01);
(Continued)

(58) Field of Classification Search
CPC ...... G10K 11/16; G10K 11/162; B32B 37/12; B32B 2307/102; B32B 2307/10;
(Continued)

(56) References Cited

U.S. PATENT DOCUMENTS 1,617,384 A    2/1927  Fisk
3,077,426 A *  2/1963  Johnston ............... B29C 43/021
                                                          112/410
(Continued)

FOREIGN PATENT DOCUMENTS

EP    1 657 375    5/2006
FR    1 342 968    11/1963
(Continued)

OTHER PUBLICATIONS

International Search Report for PCT/EP2013/051872, mailed May 23, 2013.
(Continued)

*Primary Examiner* — Edgardo San Martin
(74) *Attorney, Agent, or Firm* — Nixon & Vanderhye P.C.

(57) ABSTRACT

A sound-absorbing panel comprising a padding layer with heat-bonded synthetic fibers, wherein the padding layer has a first outer surface, a second outer surface and a first thickness, wherein the panel is made of said padding layer with no further layers of a different material between the first outer surface and the second outer surface, wherein the padding layer in at least one portion of panel has a variable density in a direction transverse to the first and second outer surfaces, the density being higher in proximity of the first and second outer layers thereof and being lower in proximity of its inner layer.

21 Claims, 8 Drawing Sheets

(51) Int. Cl.
| | |
|---|---|
| *E04B 9/34* | (2006.01) |
| *G10K 11/168* | (2006.01) |
| *E04B 1/86* | (2006.01) |
| *E04B 2/74* | (2006.01) |
| *B32B 37/12* | (2006.01) |
| *E04B 1/82* | (2006.01) |
| *E04B 9/00* | (2006.01) |

(52) U.S. Cl.
CPC .......... *E04B 2/7416* (2013.01); *E04B 2/7437* (2013.01); *B32B 2307/102* (2013.01); *E04B 2002/7461* (2013.01)

(58) Field of Classification Search
CPC ........ E04B 1/86; E04B 2/7416; E04B 2/7418; E04B 2002/7461; E04B 2002/7464
USPC .................................. 181/290, 294, 286, 285
See application file for complete search history.

(56) References Cited

U.S. PATENT DOCUMENTS

| | | | | |
|---|---|---|---|---|
| 3,353,236 A * | 11/1967 | Stedman | .................... | B28B 1/52 249/74 |
| 3,459,274 A * | 8/1969 | MacPhail, Sr. | ........... | E04B 1/86 156/78 |
| 4,193,474 A * | 3/1980 | Okubo | .................... | C04B 14/30 181/287 |
| RE30,300 E | 6/1980 | Ploeger | | |
| 4,213,516 A * | 7/1980 | Sulewsky | ............. | E04B 1/8409 181/286 |
| 4,362,222 A | 12/1982 | Hellstrom | | |
| 4,428,454 A * | 1/1984 | Capaul | ..................... | E04B 1/86 181/290 |
| 4,516,656 A | 5/1985 | Fleshier | | |
| 4,905,334 A | 3/1990 | Oppenhuizen | | |
| 5,683,772 A * | 11/1997 | Andersen | ............. | B65D 65/466 206/524.3 |
| 5,992,561 A | 11/1999 | Holben et al. | | |
| 6,490,828 B1* | 12/2002 | Fuller | .................... | B32B 3/266 156/471 |
| 6,669,265 B2* | 12/2003 | Tilton | .................. | B29C 43/203 296/146.1 |
| 6,776,258 B1* | 8/2004 | Grosskrueger | .......... | B64G 1/52 181/284 |
| 7,497,509 B2* | 3/2009 | Omiya | ................ | B60R 13/0861 181/290 |
| 7,779,964 B2* | 8/2010 | Birch | ........................ | E04B 1/86 181/284 |
| 7,998,442 B2* | 8/2011 | Pohlmann | ................. | E04B 1/86 423/198 |
| 8,070,114 B2 | 12/2011 | Chen | | |
| 8,091,605 B1 | 1/2012 | Melhart | | |
| 8,194,879 B2* | 6/2012 | Ishikawa | ............. | B60R 13/0815 181/284 |
| 8,486,516 B2* | 7/2013 | Hauber | ............... | B28B 19/0092 428/218 |
| 8,637,414 B2* | 1/2014 | Gomez | .................... | B32B 5/02 156/311 |
| 9,022,171 B2* | 5/2015 | Caimi | .................... | E04B 9/001 181/287 |
| 9,038,768 B2* | 5/2015 | Tsujino | .................... | B41J 29/10 181/201 |
| 2007/0040084 A1 | 2/2007 | Sturman et al. | | |
| 2008/0045101 A1* | 2/2008 | Near | ........................ | B32B 5/26 442/35 |
| 2008/0190690 A1 | 8/2008 | Waters | | |
| 2010/0285101 A1* | 11/2010 | Moore | ..................... | B32B 5/14 424/445 |
| 2011/0226547 A1* | 9/2011 | Kuhl | ...................... | B32B 5/022 181/294 |
| 2012/0255809 A1* | 10/2012 | Inoue | .................. | G10K 11/168 181/290 |
| 2013/0327705 A1* | 12/2013 | Clark | .................... | G10K 11/168 210/508 |
| 2014/0116632 A1 | 5/2014 | Domash | | |
| 2015/0267417 A1* | 9/2015 | Caimi | ................. | E04F 13/0862 52/506.05 |

FOREIGN PATENT DOCUMENTS

| | | | | |
|---|---|---|---|---|
| FR | 2 917 758 | 12/2008 | | |
| IT | WO 2015136428 A1 * | 9/2015 | ............... | E05D 5/06 |
| IT | WO 2015150905 A1 * | 10/2015 | ........... | E04B 2/7403 |

OTHER PUBLICATIONS

Office Action mailed Sep. 22, 2014 in U.S. Appl. No. 14/084,688.
Notice of Allowance mailed Jan. 26, 2015 in U.S. Appl. No. 14/084,688.

* cited by examiner

SOUND-ABSORBING PANEL AND ASSOCIATED MANUFACTURING METHOD

This application is the U.S. national phase of International Application No. PCT/EP2013/051872, filed 31 Jan. 2013, which designated the U.S. and claims priority to IT Application No. MI2012A000148, filed 3 Feb. 2012, the entire contents of each of which are hereby incorporated by reference.

FIELD OF APPLICATION

The present invention relates to a sound-absorbing panel and to a method for manufacturing such a sound-absorbing panel.

PRIOR ART

It is known that, when a sound wave emitted in a closed environment encounters a surface, a part of its energy passes through the surface, a part is absorbed by the impact with the surface and a part is reflected into the environment.

If an environment has a large reflective surface area, the acoustics in the environment may be greatly affected since the sound waves produced inside it are amplified with an effect similar to that of an echo.

In order to improve the acoustics of an environment without structural modifications, it is known to provide in the environment one or more sound-absorbing panels for absorbing most of the energy.

When correcting the acoustics, the internal surfaces of the environments are lined with sound-absorbing materials; these materials must have suitable characteristics not only from an acoustic but also from an aesthetic point of view since they must blend in with the architecture and the furnishings.

Sound-absorbing materials have the property that they absorb at least part of the acoustic energy and reduce the amount of energy which is reflected.

The known sound-absorbing panels, which are to be mounted for example on a wall, have a structure composed of a foam layer (for example foam rubber) lined with a sheet and kept rigid by a perimetral frame made of metal (for example aluminum), plastic or wood. The sheet is typically folded around the perimetral frame so as hide, at least on a visible side, stitches or other joints. However, when a sound-absorbing panel must have two visible sides, it is more difficult to conceal a joint in the sheet in a zone where two end portions of the sheet overlap.

In other known panels, the padding layer is combined with a rigid surface (for example made of metal, plastic or wood) which increases its rigidity and/or increases its acoustic performance. The rigid surface may be positioned on one side of the padding or inside the padding itself, creating a sandwich structure.

U.S. Pat. No. 6,490,828 B1 discloses a panel covering for use in an office environment. The panel covering includes an exterior layer including a decorative surface treatment. The panel covering also includes an interior base layer including a polymer material coupled to the exterior layer. The panel covering also includes a reinforcing layer including a porous web installed between the exterior layer and the interior layer.

The polymer material may include polyethylene terephthalate or PET. A method of forming a panel covering is also disclosed in U.S. Pat. No. 6,490,828 B1.

A first disadvantage of the sound-absorbing panels designed in accordance with the prior art consists in the presence of the frame or the support surface. They may in fact have a considerable weight and hence be difficult to handle, mount and support; moreover often the frame or the support surface are the most costly item of the panel.

Another disadvantage, as already mentioned, is that the sound-absorbing panels must have not only good sound-absorbing properties but also suitable aesthetic characteristics since they must blend in with the architecture and the furnishings. The frame and the joints between two end portions of a sheet used to cover the panel are undoubtedly negative elements which may create a lack of harmony with the surrounding environment.

Moreover, the frame (especially if made of metal) of a sound-absorbing panel does not act as a sound-absorbing material and often reduces the surface area of the sound-absorbing padding which can be effectively reached by the waves.

EP 1 657 375 discloses a sound insulation plate for laminate floors and other uses. It has continuously variable density across its thickness, and consists of a mixture of wood fibers, a bonding agent of glued fibers and/or support fibers, and a recycled plastic material.

The technical problem of the present invention is to provide a sound-absorbing panel which is relatively simple to construct and install and which solves at least one of the abovementioned problems.

SUMMARY OF THE INVENTION

The inventor has surprisingly discovered that the problem may be solved with a sound-absorbing panel comprising a padding layer with a variable density which is higher in proximity of the outer layers thereof and lower in proximity of the central layer. The higher density in proximity of the outer layers increases substantially the rigidity of the panel without influencing negatively the sound-absorbing performance. Preferably, the panel has a substantially symmetric cross-section. In particular, the density in proximity of the first outer layer is substantially the same as the density in proximity of the second outer layer. The panel is preferably shaped so that an edge with reduced thickness is provided along at least a portion of the perimeter of the panel. Preferably, the reduced thickness edge is provided along the whole perimeter of the panel. The reduced thickness edge highly increases rigidity of the panel.

Preferably, the panel has a symmetric cross-section shape. The shape of the panel could be also referred to as a dual lens shape. In other words, the shape is similar to two lenses which are coupled together in a closed fashion. With a different terminology, the panel according to the present invention could be referred to as a dual shell shape. Also under this language, there are provided two shells which are coupled together.

In any case, the shape of the panel surface which is convex outwardly in proximity of edges contributes to improve acoustic performance because it acts as a diffuser. Sounds are reflected in a non uniform manner, differently from a totally planar surface.

The increased rigidity, in turn, results in the possibility of using the panel without a frame and of performing the fixing of screws (typically common wood screws) or other fixing elements directly into the panel itself. Moreover, owing to its greater rigidity, a substantially flat panel able to maintain substantially its substantially planar form is obtained.

According to a first aspect, the present invention provides a sound-absorbing panel comprising a padding layer with heat-bonded synthetic fibers, wherein the padding layer has a first outer surface, a second outer surface and a first thickness, wherein the panel is made of said padding layer with no further layers of a different material between the first outer surface and the second outer surface, wherein the padding layer in at least one portion of panel has a variable density in a direction transverse to the first and second outer surfaces, the density being higher in proximity of the first and second outer surfaces thereof and being lower in proximity of its innermost layer, so that hard outer surfaces are provided. All the thicknesses are understood as being measured in a direction transverse to the outer surfaces of the panel. All the measurements are understood, unless otherwise indicated, as being preceding by the word "about".

In embodiments of the invention, the density in proximity of the first outer surface is substantially as the density in proximity of the second outer surface.

In embodiments of the invention, in the at least one portion of the panel, the weight of an outer layer having a thickness of about 10% of the first thickness is between about 20% and 30% of the weight of the panel in said at least one portion.

In embodiments of the invention, in the at least one portion of the panel, the weight of an outer layer having a thickness of about 20% of said first thickness is between about 25% and 45% of the weight of the panel.

In embodiments of the invention, the panel further comprises a first layer of fabric facing the first outer surface of the padding layer and a second layer of fabric facing the second outer surface of the padding layer.

Preferably, the padding layer is shaped so that it is provided with an edge with a second thickness, smaller than the first thickness, in at least a portion of a perimeter of the panel.

The second thickness could be between about 5% and about 20% of the first thickness measured at a central location of the panel.

The edge might have a density substantially as, or higher than, the density in proximity of said first and second outer layers. Preferably, the edge has a density considerably higher than the density in proximity of said first and second outer layers. For instance, density of the edge can be twice the density in proximity of said first and second outer layers.

Preferably, the panel is outwardly convex in proximity of the edge for improving acoustic performance.

In embodiments of the invention, the heat-bonded synthetic fibers comprise polyester fibers.

Preferably, there is provided an adhesive layer arranged between the first and second outer surfaces of the padding layer and each of said layers of fabric.

The sound-absorbing panel of the invention could be provided with one or more depressions having a thickness smaller than the first thickness. The depressions could be provided with one or more holes for fixing members such as screws or the like.

In embodiments of the inventions, fins are provided. Such fins are configured to penetrate into holes of a support frame.

According to a second aspect, the present invention provides a method for manufacturing a sound-absorbing panel, comprising the steps of:
a) providing a padding layer with heat-bonded synthetic fibers, wherein the padding layer has a first outer surface and a second outer surface and has an initial thickness, wherein, in at least one portion of the panel, the panel is made of the padding layer with no further layers of a different material between said first outer surface and said second outer surface;
b) treating the padding layer so that, in said at least one portion thereof, it changes from the initial thickness to a first thickness and so that, in said at least one portion of the panel, the panel has a variable density in a direction transverse to the first and second outer surfaces, said density being higher in proximity of the first and second outer layers thereof and being lower in proximity of its innermost layer.

The treatment step may comprise the steps of:
c) laying a first layer of fabric facing the first outer layer of the padding layer and a second layer of fabric facing the second outer layer of the padding layer;
d) pre-heating the padding layer;
e) forming the padding layer by exerting a pressure on said padding layer associated with the first and second layers of fabric at least in a portion of the perimeter of the panel so that the thickness of the padding layer changes, at least in said portion of the panel, from the initial thickness to a first thickness.

The method may further comprise one or more of the following steps:
f) depositing an adhesive layer between the padding layer and each of said layers of fabric;
g) shaping the edge in order to finish the ends of said edges; and
h) drilling at least one hole where at least one depression with a reduced thickness is present.

In preferred embodiments, the adhesive layers are deposited on the inner side of the layers of fabric.

DETAILED DESCRIPTION

Figure 1:
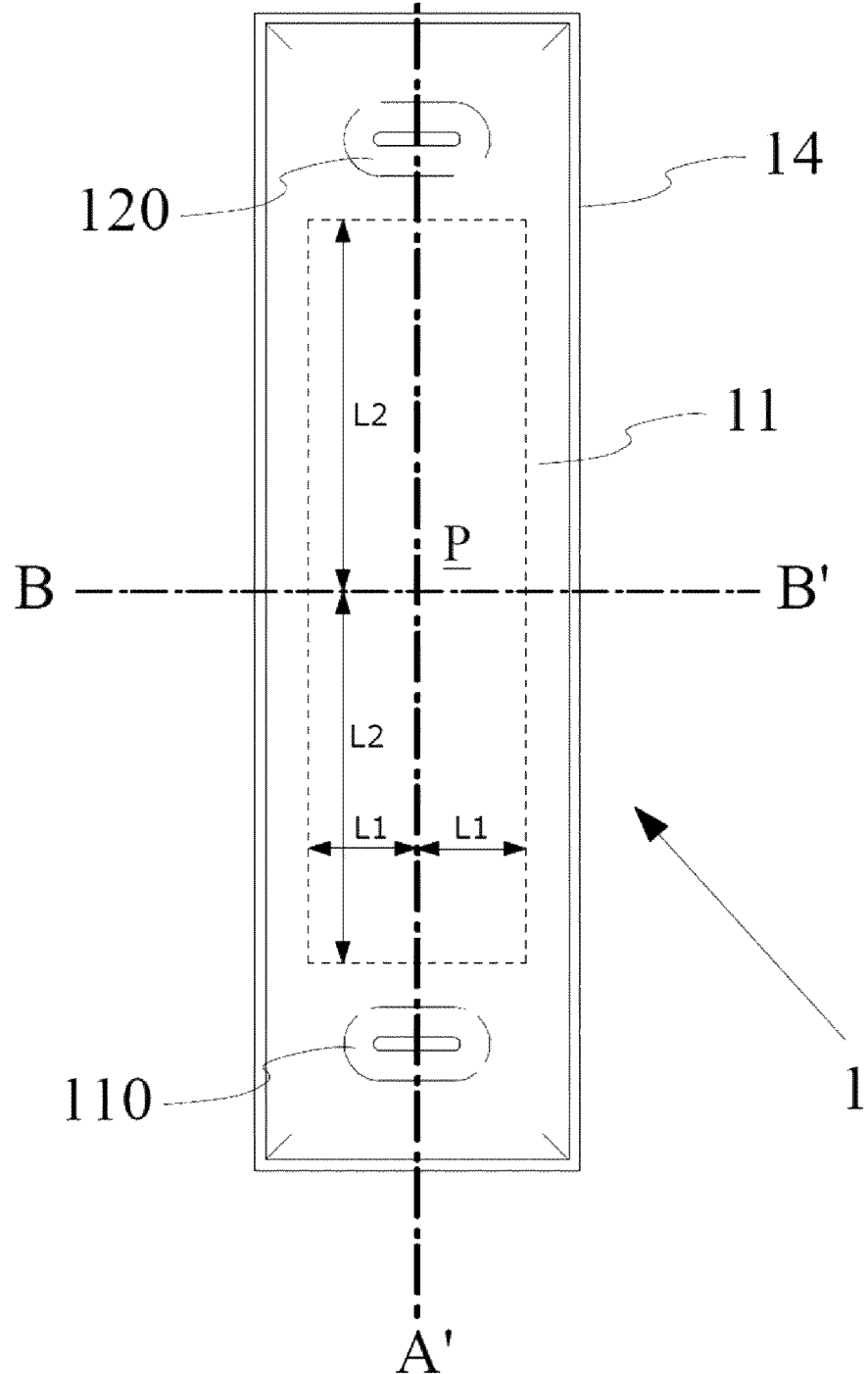
FIG. 1 is a schematic front plan view of a sound-absorbing panel according to an embodiment of the invention.
Figure 2:
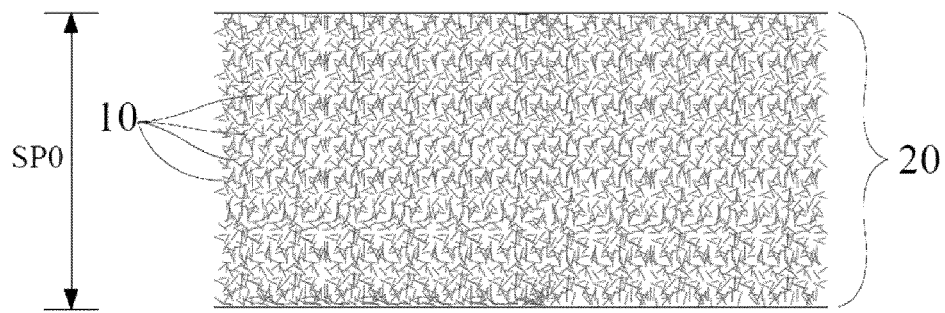
FIG. 2 is a partial axially sectioned view of a padding layer before the forming step, according to the invention.
Figure 3:
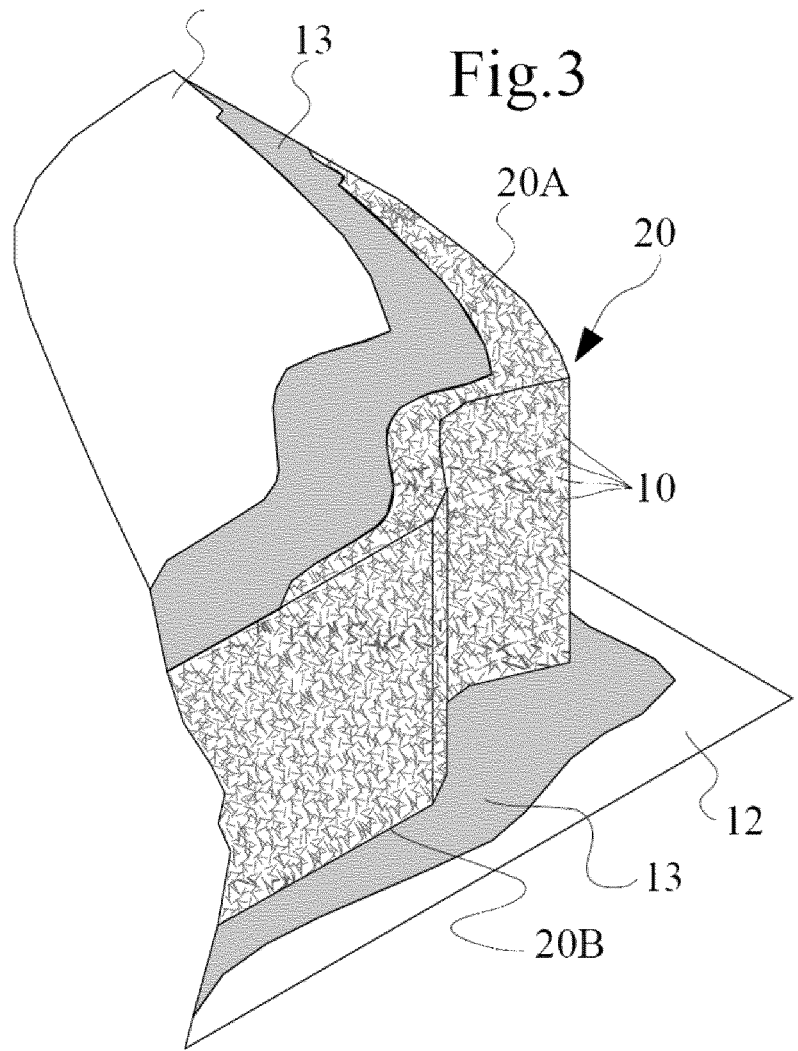
FIG. 3 shows the various layers of the panel of FIG. 1.

With reference to FIGS. 1, 2 and 3, the invention relates to a sound-absorbing panel 1 comprising a suitably shaped padding layer 20. The padding layer comprises heat-bonded synthetic fibers 10. In embodiments of the invention, the padding layer 20 is only made of synthetic fibers 10.

Profitably, the panel 1 of the invention comprises a first and a second layers 11, 12 of fabric facing a first and a second outer opposite surfaces 20A, 20B of the padding layer 20. The padding layer 20 is preferably shaped so that it has an edge 14 with a thickness smaller than the thickness of the padding layer at a central location of the panel 1. The edge 14 may be a continuous edge along the whole perimeter of the panel or it may be along only a portion threreof. The reduced thickness edge 14 highly increases rigidity of the panel.

Preferably, the panel 1 has a symmetric cross-section shape. Preferably, the shape of the panel could be also referred to as a "dual lens" shape. In other words, the shape of the panel (at least in proximity of the edge 14) is similar to two lenses which are coupled together in a mirrored closed fashion. With a different terminology, the panel 1 according to the present invention could be referred to as a dual shell shape. Again, it appears as two shells which are coupled together in a closed arrangement along the edge 14.

In any case, the shape of the panel surface is convex outwardly in proximity of edge 14 and this contributes to improve acoustic performance because it acts as a diffuser. Sounds are reflected in a non uniform manner, differently from a totally planar surface.

Figures 6A, 6C:
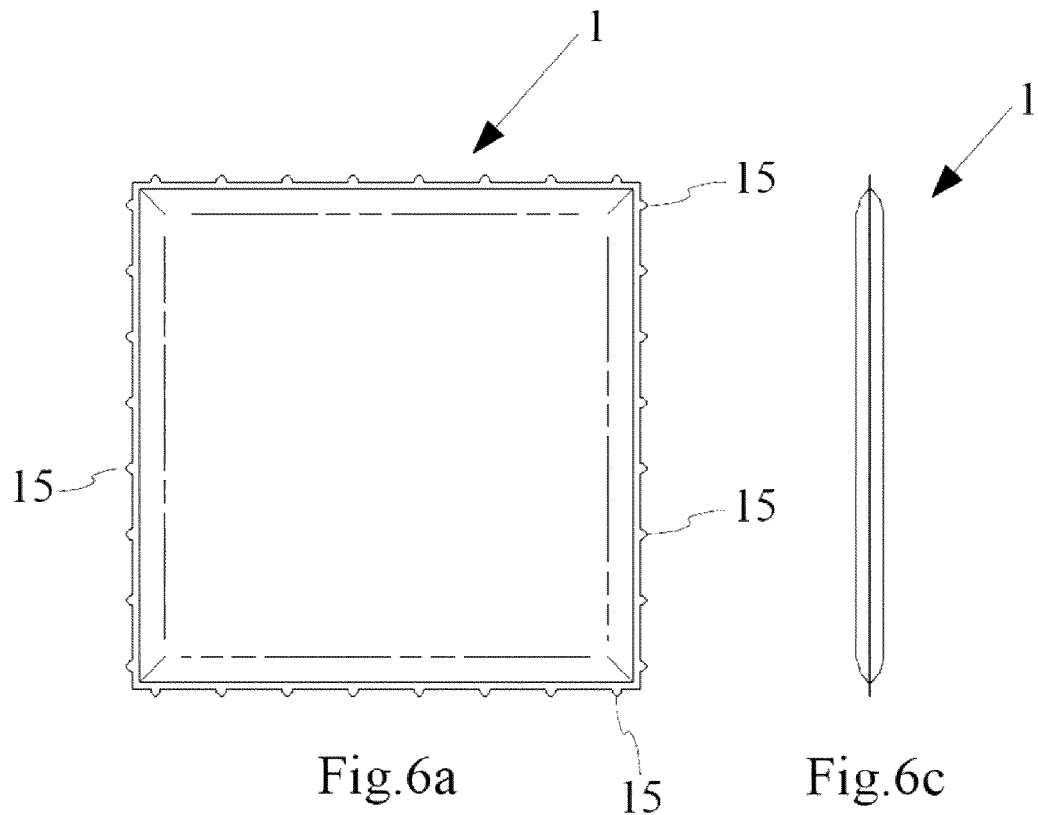
FIGS. 6a, 6b and 6c show a sound-absorbing panel according to another embodiment of the invention.
Figure 6B:
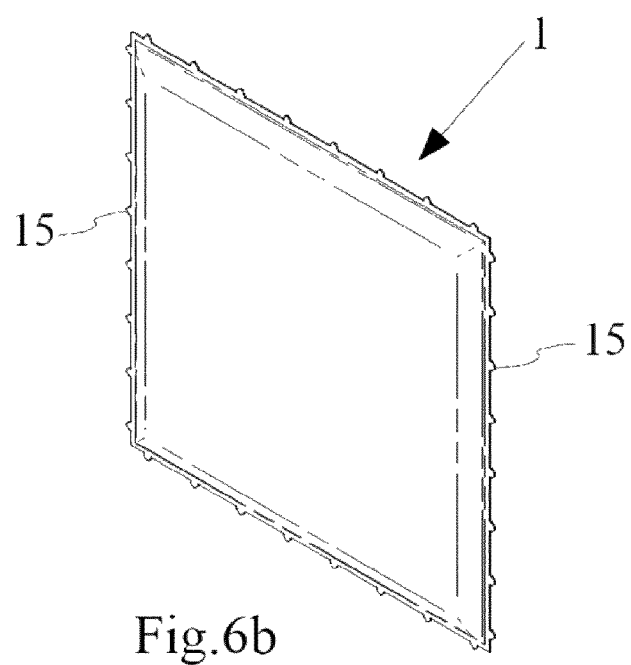

The panel 1 may have a substantially rectangular shape (as in FIG. 1) or any other shape such as a square shape (substantially as shown in FIGS. 6a, 6b and 6c), circular, oval, elliptical, triangular, trapezoidal or other shape.

In one embodiment, the heat-bonded synthetic fibers 10 comprise polyester fibers. In one embodiment, the heat-bonded synthetic fibers 10 are only polyester fibers.

The fibers 10, before processing, may have a density ranging from about 10 kg/m$^3$ to about 100 kg/m$^3$, for example between 30 kg/m$^3$ and 60 kg/m$^3$.

In a preferred embodiment of the invention, the fibers 10, before processing, have a density substantially equal to 44+/−5 kg/m$^3$.

The average density after processing is about 72+/−10 kg/m$^3$.

Preferably, the fibers 10 have a diameter of between about 20 μm (micron) and about 50 μm (micron), preferably a diameter of about between about 30 μm and about 35 μm.

The fibers 10 may be used in a temperature range of between about −40° C. and about 80° C.

Preferably, the fibers are non-toxic and non-irritants. Furthermore they are completely recyclable.

The sound-absorbing panel 1 according to the invention preferably comprises a first layer of fabric 11 facing a first surface 20A of the padding layer 20. The sound-absorbing panel 1 also comprises, preferably, a second layer of fabric 12 facing a second opposite surface 20B of the padding layer 20. FIG. 3.

Preferably, the layers of fabric 11, 12 are also made of polyester.

For example, the fabric is made by intertwining an elastic textured yarn with a yarn count of 750 dtex per warp and weft. The structure may be formed by 1600 yarns and 1500 wefts per meter using a crepe weave. The weight per square meter may be about 300 g. In one embodiment, the fabric is of the flame-retarding Trevira CS type.

According to the invention (FIG. 3), the panel 1 preferably comprises an adhesive layer 13 arranged between the padding layer 20 and each of the layers of fabric 11 and 12.

In particular, the adhesive layer 13 may advantageously comprise a layer of glue, preferably applied by means of spreading on the layers of fabric.

The panel 1, at a central location P thereof (FIG. 1), has a first thickness SP1, preferably of between about 2 cm and about 7 cm. In one embodiment, the first thickness is about from 3.4 cm to 3.7 cm.

For the purposes of the present description and the accompanying claims, the term "central location P" is understood as meaning a location inside a central area of the panel. In turn, the term "central area" is understood as meaning an area sufficiently distant from the perimeter of the panel and from the transition contour. For example, in the case of a panel of rectangular shape with a first axis parallel to the long side and a second axis parallel to the short side, the central area is a substantially rectangular area which is symmetrical with respect to the first axis and second axis. The central area may have a width equal to 2×L1, where L1 is about 30% of the width of the panel, and a length equal to 2×L2, where L2 is about 30-40% of the height of the panel. In FIG. 1 a central area for the panel 1 is indicated for example by means of a broken line. For a panel with a square shape, the central area may have a square area centered on the center of the panel having a side with a length equal to about 50% of the side of the panel. In the case of a circular shaped panel, the central area may have a central area centred on the center of the panel and having a diameter equal to about 50% of the panel diameter. In the central area there may be fastening depressions (such as the depressions 110 and 120 which are shown in FIG. 1 and which will also be mentioned below), but these small-thickness localized depressions must not be considered for the purposes of an assessment of the thickness of the panel in the central area.

Figure 4:
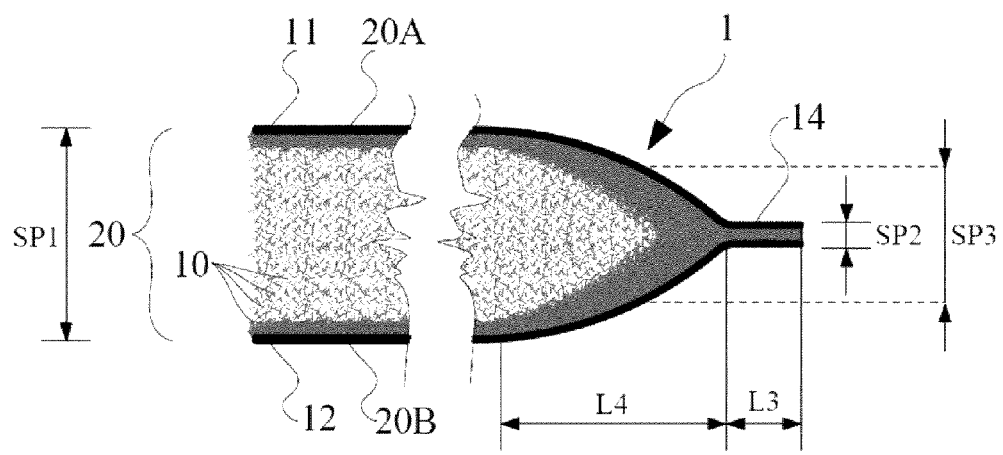
FIG. 4 is a schematic cross-sectional view of a part of the panel according to FIG. 1.

With particular reference to FIG. 4, advantageously, according to the invention, the panel 1 is shaped so as to have an edge 14 with a second thickness SP2 smaller than the first thickness SP1. The edge has a width L3 (FIG. 4) which may be for example about 0.5-2.0 cm.

According to the invention, the second thickness SP2 in proximity of the edge 14 is between about 5% and about 20% of the first thickness SP1. In one embodiment, the second thickness SP2 in proximity of the edge 14 is between 2 mm and 7 mm.

According to the invention, the edge 14 is formed on at least a portion of the perimeter of the panel 1.

Preferably, the edge 14 is formed along the entire perimeter of the panel 1.

According to the invention, the panel 1 has a transition thickness SP3 which is variable depending on the distance between the edge 14 and the central location P.

In particular, the transition thickness SP3 increases from the value of the second thickness SP2 to the value of the first thickness SP1 with a substantially logarithmic progression upon an increase in the distance from the edge 14.

The panel 1 has different density values starting from the central location P and progressing as far as the edge 14. The greatest density is illustrated schematically in FIG. 4 by means of darker areas where the fibers are closer and more compact.

Moreover, preferably, the padding layer 20, in at least one portion of the panel (for example the central area P) has a variable density, higher in proximity of the two outer surfaces 20A, 20B thereof and lower in proximity of its central (or innermost) layer.

Figure 8:
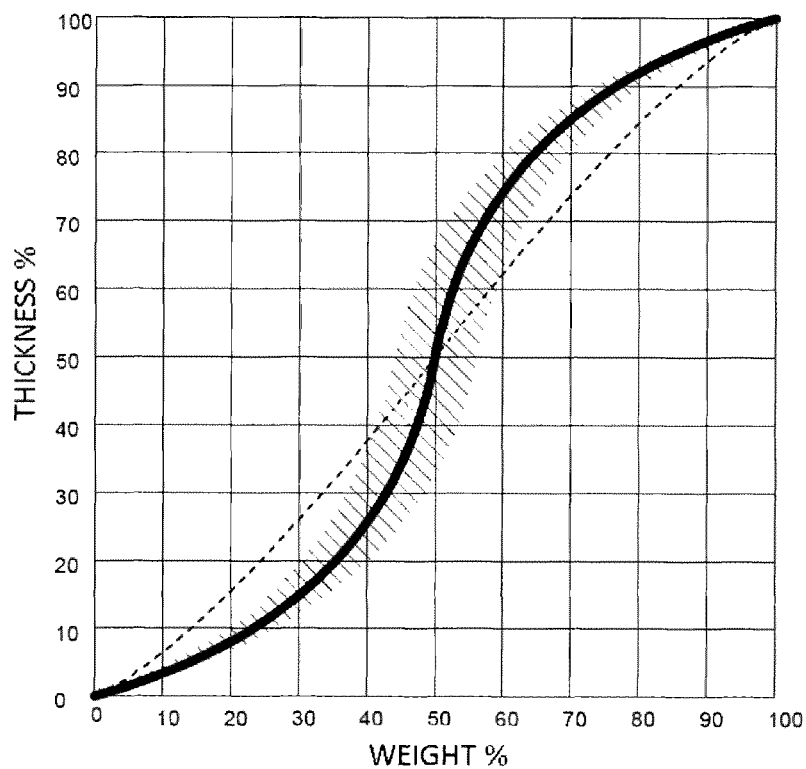
FIG. 8 is a graph which shows the percentage progression of the weight of the panel with respect to its thickness.
Figure 9:
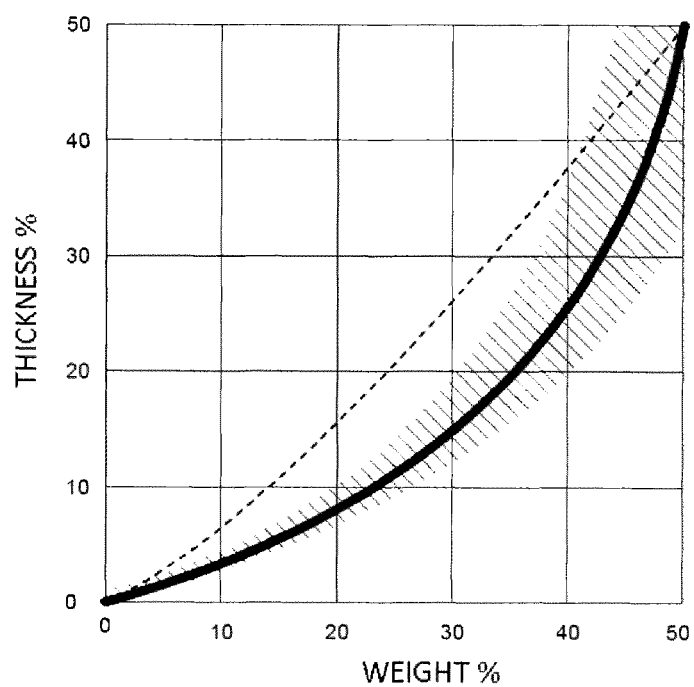
FIG. 9 is a graph which shows, on a larger scale, the percentage progression of the weight of the panel with respect to its thickness in one half of the panel.

The graphs in FIGS. 8 and 9 show this difference in density, in percentage terms. In particular, in the graph shown in FIG. 8, the % weight is shown along the x axis and the % thickness is shown along the y axis. The graph in FIG. 8 shows a hatched area, a continuous bold curve and a thinner broken line.

The thin broken line is substantially a straight line and represents the reference values of a known padding layer which has not undergone any major processing and in particular no compression.

The continuous bold line shows the average progression of the thickness and weight (again in percentage terms) of a padding layer of a panel according to the present invention, without layers of fabrics. It is clear that, in the outermost layers of the padding layer according to the invention (up to about 10-20%), the weight is greater than that of inner layer. More specifically, the % weight of an outer layer with a thickness of about 10% of the total weight of the panel is about 20-25% of the total weight.

The inventor has performed various calculations on samples, without lining fabric, and has noted, in some cases, a deviation from the continuous line shown in the graph of FIG. 8. By plotting the values obtained with the measurements, an area (hatched area in FIG. 8), within which most of the measured values fall, was identified.

FIG. 9 is a view of part of FIG. 8 on a larger scale. In particular, it relates to half of the thickness of the padding layer of the invention with the outer layer (or skin) having a greater density than the inside or core.

Preferably, the padding layer 20 at the central location P has a density ranging between about 40 kg/m$^3$ and 90 kg/m$^3$, preferably about 74+/−10 kg/m$^3$.

Differently, the padding layer 20 along the edge 14 has a density ranging between about 350 kg/m$^3$ and 900 kg/m$^3$, preferably about 530 kg/m$^3$+/−20%.

Advantageously, according to the invention, the structure created does not require any support frame; in fact the edge 14 has a high density, it is rather rigid and acts as a frame. In addition, there is provided a high density substantially closed dual shell which covers a medium density and low density padding layer. The high density substantially closed shell is substantially rigid. Self tapping screws can be screwed in the hard and rigid outer surface of the panel according to the present invention and/or in the edge and/or in the depressed areas.

It should be noticed that the sound-absorbing panel according to the present invention does not comprise any support layer in the padding layer. In other words, the padding layer has a first outer surface and a second outer surface and is made of a padding layer with no further layers of a different material between the first outer surface and the second outer surface. The padding layer, in said at least one portion of panel, has a variable density in a direction transverse to the first and second outer surfaces. The density is higher in proximity of the first and second outer layers and is lower in proximity of its inner layer. The density, preferably, constantly decreases from the outer surface to the layer which is at the center of the panel. The density is substantially symmetric from one outer surface (20A) to the opposite outer surface (20B).

Moreover, the panel according to the invention, in an embodiment, does not require any joining together of end portions of a sheet since no covering sheet is used; the cover, in fact, in an embodiment, is composed of the layers of fabric 11 and 12 which form a single body with the padding layer 20. The aesthetic features are, therefore, particularly attractive and may be blended in (as regards both colour and shape) with the features of the surrounding environment. In another embodiment, by way of alternative or in addition to the two layers of fabric 11, 12, a removable cover (not shown in the drawings) may be provided for covering the panel and adapting it to the various requirements. For example, a personalized cover bearing the logo of a company, images or decorations may be provided. Moreover, advantageously, the edge 14 of the sound-absorbing panel of the invention also acts, at least partly, as a sound-absorbing material and prevents sound waves from being reflected. In fact, the edge is made of the same material as the central part, albeit with a different density and different mechanical properties.

In an embodiment of the invention, the sound-absorbing panel 1 comprises at least one fastening depression 110, 120 (FIG. 1), situated for example between the edge 14 and the central location P. The depressions 110, 120 may have a central part with a thickness which is the same as, less than or greater than the edge thickness SP2 and a transition part with a thickness progression substantially corresponding to the transition thickness SP3 in the vicinity of the edge 14.

In other words, the depressions 110, 120 are zones of the panel with a reduced thickness which are used for a fastening device and/or for providing extra rigidity in addition to the rigidity provided by the edges and/or for decorating the surface of the panel.

According to another embodiment, the panel 1 comprises edge fins 15 which extend outwards from the perimeter of the panel. These fins 15 are configured to penetrate into corresponding slots 17 in a support frame 16.

Figure 7:
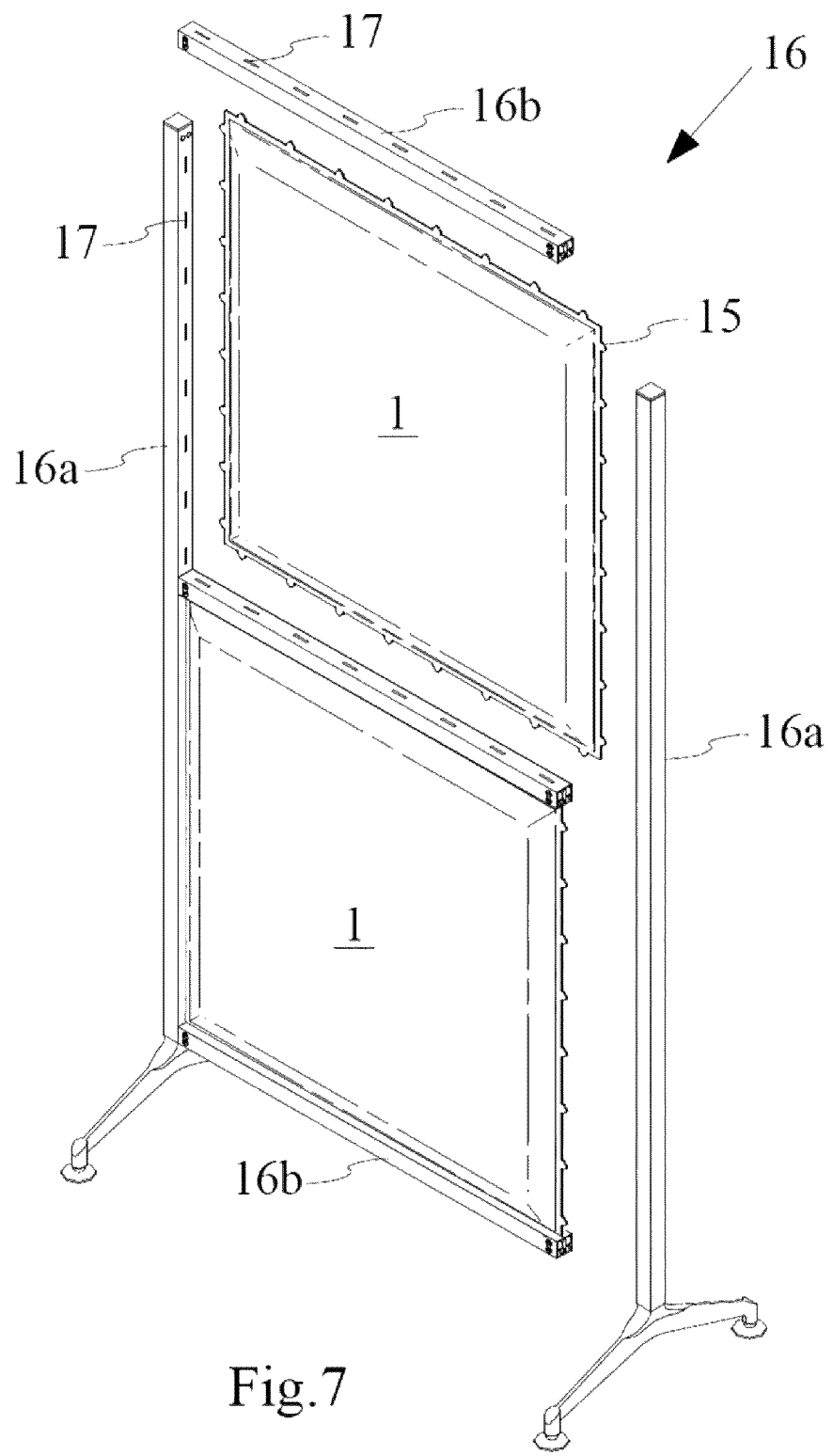
FIG. 7 shows assembly of the panels according to FIG. 6 on a frame.

FIGS. 6a, 6b and 6c show a panel 1 with a substantially square shape having fins 15 which are substantially equally spaced and project outwards. FIG. 7 shows two panels 1 with fins 15 which are being mounted on a frame 16 with two vertical uprights 16a and three horizontal cross-members 16b. The uprights and the cross-members are configured to form two or more substantially square or rectangular frames able to contain and retain two or more panels 1. In this way a partition for dividing rooms and absorbing noise is provided.

The present invention, according to another aspect thereof, relates to a method for manufacturing the sound-absorbing panel.

During a first step (a) a padding layer 20 comprising, or entirely made of, the heat-bonded synthetic fibers 10 is provided. The padding layer 20 has a first, substantially constant thickness SP0, greater than the thickness SP1 of the padding layer in the central area after forming. SP0 could be about 60 mm.

During a step (b) of the method for manufacturing the panel, a first layer of fabric 11 is laid so as to face a first outer surface of the padding layer and a second layer of fabric 12 is laid so as to face a second outer surface of the padding layer 20.

Before the step (b) a layer of adhesive 13 may be advantageously deposited between the layers of fabric 11, 12 and the padding layer 20 in order to ensure better adhesion of the layers of fabric 11, 12 to the padding layer.

During a step (c) of the method, the assembly of padding layer 20 and layers 11, 12 of fabric is pre-heated.

Preferably, the pre-heating of the padding 20 is performed at a temperature C1 of between about 130° C. and about 170° C., preferably about 150° C. for a predefined time interval Δti.

The time interval Δti may range between about 2 min. and about 5 min., for example Δti may be about 3.5 min.

Preferably, the adhesive layer 13 comprises a layer of glue, preferably of the PE type, applied by means of spreading on the layers of fabric.

Pre-heating of the padding layer 20 (which makes the padding layer soft and deformable, in particular on both its sides), together with the presence of the adhesive 13, helps ensure even stronger bonding between the padding 20 and the layers of fabric 11, 12.

Figure 5:
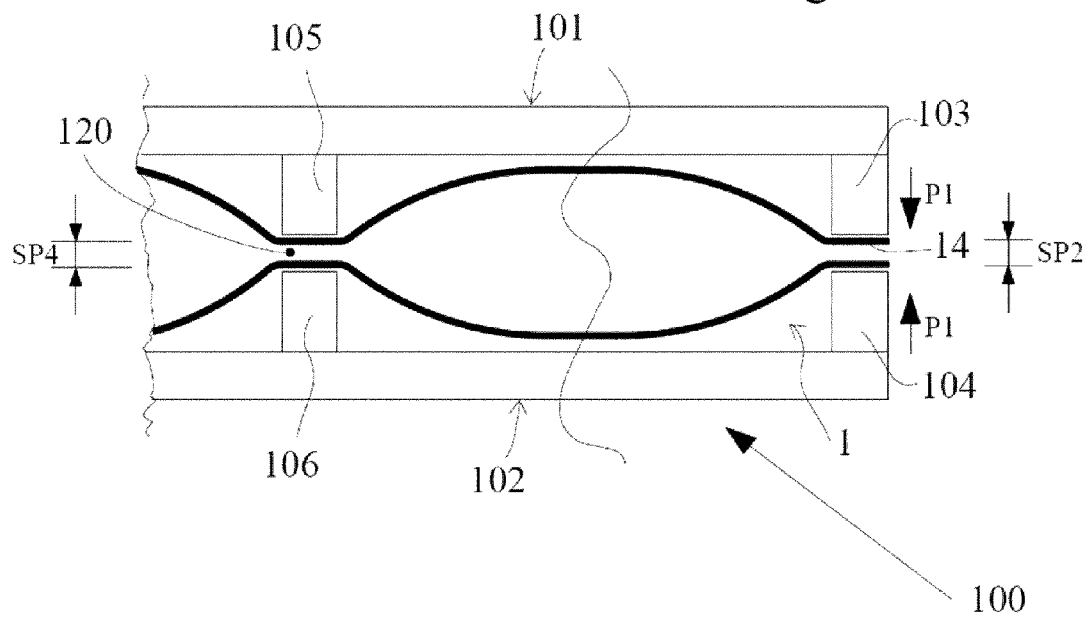
FIG. 5 shows schematically an apparatus for performing the forming step according to an aspect of the invention.

During a further step of the method for manufacturing the panel 1 it is envisaged forming (d) the padding layer 20 by exerting a pressure p1 on the padding layer 20 associated with the first and second layer of fabric 11, 12 at least in a portion of the perimeter of the panel 1. Preferably, the pressure p1 is exerted along the entire perimeter of the panel 1. FIG. 5.

The pressure p1 applied ranges between about 150 ton/m$^2$ and 250 ton/m$^2$, for example 220 ton/m$^2$.

Owing to the pressure exerted along a portion of the perimeter (or, preferably, along the entire perimeter), the perimetral edge 14 of reduced thickness is formed. Moreover, the pressure exerted stretches the first and second layer of fabric and compresses the (pre-heated) padding layer 20 in the central part (and as far as the edge) so as to obtain a panel with a substantially uniform thickness SP1, apart from the zones in the vicinity of the edge. Therefore, the thickness of the panel changes from the thickness SP0 (for example about 6 cm or about 4.5 cm) to the thickness SP1 (for example about 3.5 cm) owing to the tension exerted by the layers of fabric 11, 12 and owing to the fact that the padding layer 20 is pre-heated and therefore more easily deformable.

In this way the edge 14 with thickness SP2 is formed. The thickness SP2, at the end of forming, is between about 5% and about 20% of the first thickness SP1 of the padding layer 20 at a central location P of the panel 1.

According to the invention, owing to the heating step (b) and the forming step (d), compaction occurs between the layers of fabric 11, 12 and outermost zones, relative to the central point P, of the padding layer 20, resulting in hardening of the panel 1 along the edge 14. The adhesive layer 13 helps reinforce the bond between the padding and the fabric also along the entire edge 14, consequently increasing the rigidity of the edge 14.

In the method according to the invention, the step (d) of forming the edges 14 may be performed by means of an apparatus 100 (schematically shown in FIG. 5) comprising a top plate 101 and a bottom plate 102.

Preferably, the plates 101 and 102 comprise corresponding frames 103 and 104 facing each other and able to exert the pressure p1 on the edge 14 until the applied pressure or the desired thickness is reached.

Preferably the plates and the frames are made of metal, for example aluminum or steel.

Preferably the plates 101, 102 comprise corresponding facing projections 105 which are able to exert said pressure p1 on areas situated between the edge 14 and the central location P, producing respective depressions 110, 120.

The forming step (d) is preferably followed by a further edge shaping step (e) for finishing the ends of the edges 14 (and, where necessary, forming the fins 15).

In order to allow the panel to be hung, a further step (f) envisaged is that of drilling the panel 1 at the location where the depressions 110, 120 are present. The aforementioned edge shaping step may be performed following or at the same time as drilling in the region of any depressions.

Advantageously, according to the invention, the holes produced by the drilling step (f) allow the panel to be fixed to a wall (or ceiling) or the panel to be hung by means of suitable hooks, ties or self-supporting structures.

Even more advantageously the edge shaping and drilling steps may be performed at the same as the pressing step with the pressure P1.

Owing to the low weight of the panel 1 according to the invention, all the support means necessary for hanging or joining the panel may be easily provided.

Preferably the padding layer 20 and the layers of fabric 11, 12 are made of fireproof material.

Preferably the padding layer 20 and the layers of fabric 11, 12 are treated with anti-bacterial material.

By way of conclusion, the panel according to the invention achieves a plurality of advantages.

It does not require any support frame because the edge acts as a frame. There is provided a continuous outer surface layer, connected at the edge of the panel, which is substantially hard because made of high density fibres. Such continuous outer surface layer confers high rigidity to the panel. It forms a sort of closed rather hard shell. The material within the shell has a density which decreases towards the innermost part of the panel.

It does not require any joining together of end portions of a sheet since (at least in one embodiment) no covering sheet is envisaged; the cover is in fact composed of the layers of fabric which form one piece with the padding layer.

The aesthetic features are particularly attractive and may be blended in with the features of the surrounding environment.

The edge also acts, at least partly, as a sound-absorbing material and prevents sound waves from being reflected.

It may be easily hung on a wall or the ceiling or joined to a support base since it is very light compared to the panels of the prior art.

Owing to the low weight of the panel, the support means required for hanging or joining the panel may be easily provided.

It is 100% recyclable since it can be made entirely of polyester.

The Applicant has carried out sound-absorption tests. In particular, the Applicant initially tested a layer of sound-absorbing material which was not shaped, having a substantially constant thickness equal to SP0 and a substantially constant density. Then the Applicant carried out the same tests on a panel according to the invention, having shaped edges, a small thickness and higher density in proximity of the edges and the outer faces. Surprisingly, the Applicant has found that a panel according to the invention has sound-absorbing characteristics which remain substantially unvaried in the speaking frequency range, compared to a similar layer of sound-absorbing material which is not shaped.

Figure 10:
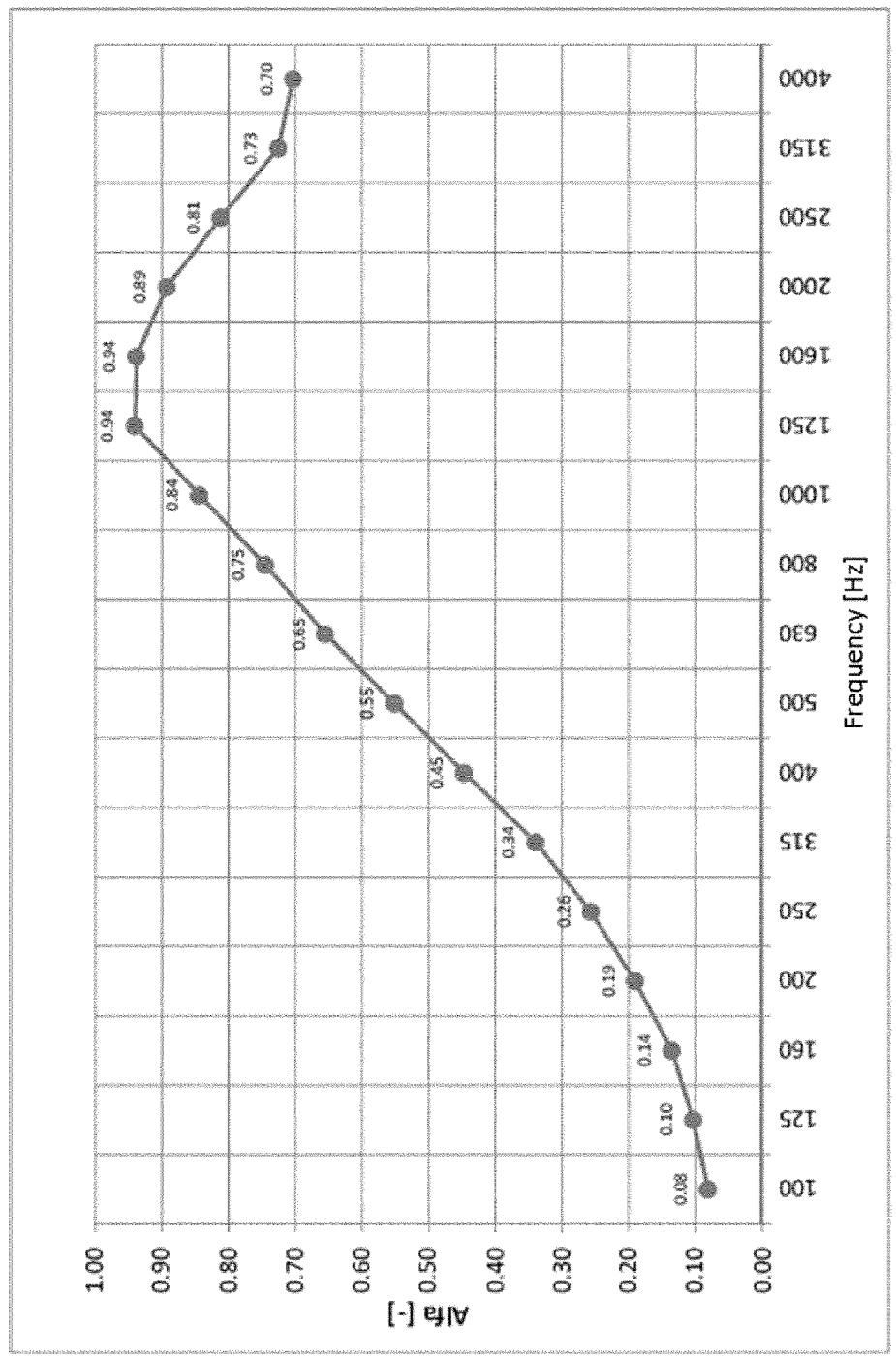
FIG. 10 is a graph of Frequency [Hz] Vs. sound absorption coefficient for normal incidence of a circular sample of the panel according to one embodiment of the invention.
Figure 11:
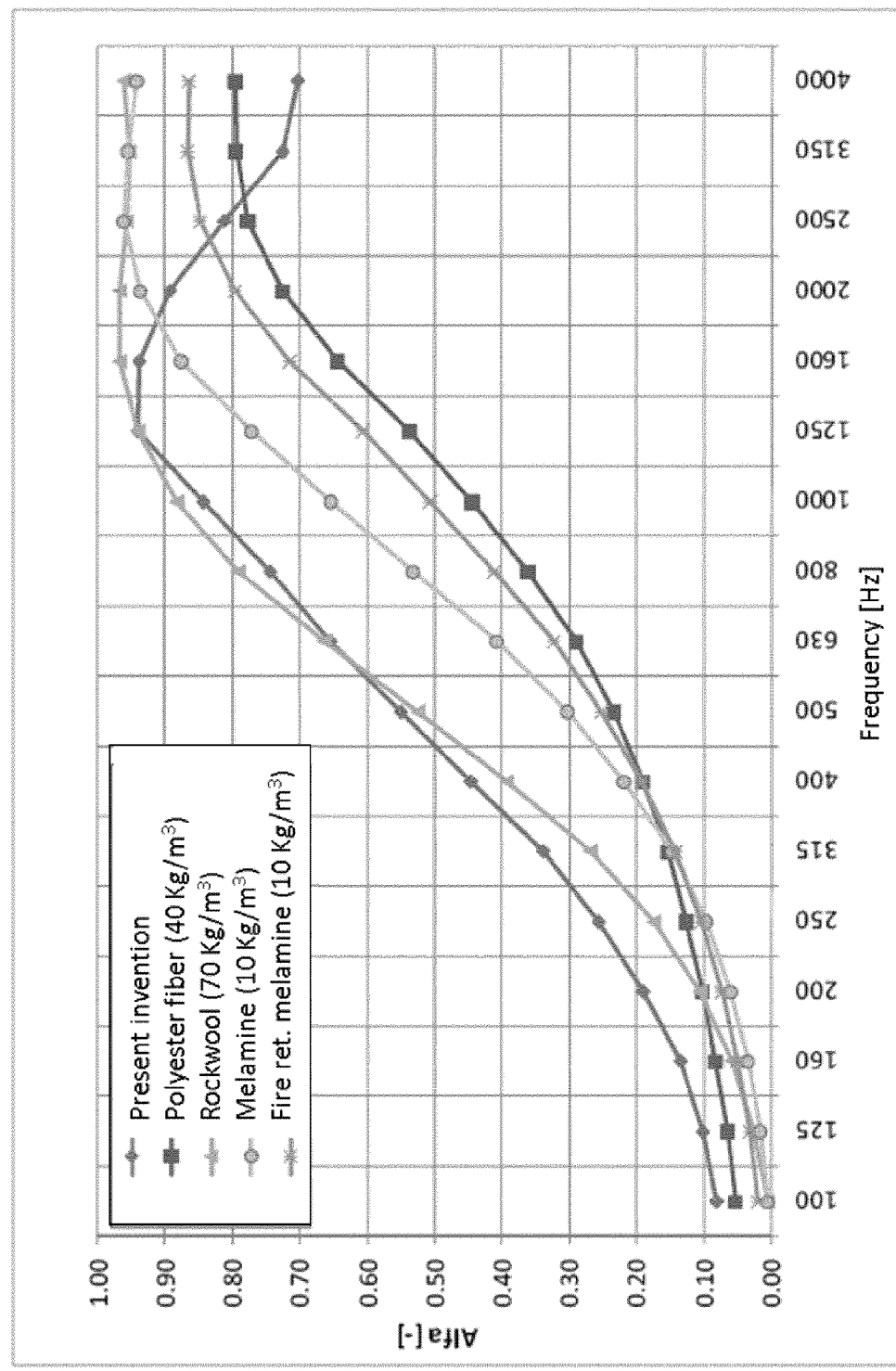
FIG. 11 is a graph of Frequency [Hz] Vs. sound absorption coefficient for normal incidence of several different comparative samples of panels.

Furthermore, the Applicant carried out further tests. The sound absorbing coefficient for normal incidence was calculated in Kundt's tube prepared according to Standard UNI EN ISO 10534-2. The graphics of FIGS. 10 and 11 show how the panels according to the present invention affect the acoustic of a room. For the tests, a circular sample of a panel according to one embodiment of the invention has been used. The sample was of about 44.5 mm and it was taken at about the center of the panel (where the panel has a full thickness of about 37 mm), not in a region where the transition from edge to full thickness takes place. The panel from which the sample has been taken comprised a padding layer, two adhesive layers arranged between first and second outer surfaces of the padding layer and two layers of fabric. As said above, the thickness of the sample was about 37 mm, including the layers of fabric and adhesive.

As it can be inferred from the graph of FIG. 10, notwithstanding the rather reduced thickness, they do well in absorbing the low frequencies (below about 500 Hz), those that characterize deep sounds that are normally more difficult to dampen.

The panels according to the present invention absorb very well the midrange frequencies (between 500 and 2,000 Hz), those typical of the human voice and generally in all workplaces. They tend to reflect, gradually absorbing less of the high frequencies (above 2,000 Hz) those which by their nature are already in large part absorbed by the walls, the furnishings and by the very presence of people in the room.

The result thus obtained is a comprehensive, natural balance of sounds in the environment.

FIG. 11 shows several graphs resulted from tests made on circular samples of different materials. The test conditions were maintained the same for all tested materials. In particular, paddings of the following materials were tested: (a) fibers of polyester (average density of about 40 Kg/m$^3$), (b) rockwool (average density of about 70 Kg/m$^3$), (c) melamine (average density of about 10 Kg/m$^3$), (d) fire retardant melamine (average density of about 10 Kg/m$^3$).

FIG. 11 shows that the present invention has better performance in terms of absorbing the low frequencies (below about 500 Hz). The performance at higher frequencies up to about 1,600 Hz was about as the comparative panels. The performance was lower than other comparative materials at very high frequencies (higher than 2,000 Hz).

The invention claimed is:

1. A sound-absorbing panel comprising:
   a padding layer comprising heat-bonded synthetic fibers, wherein said padding layer comprises:
      a first outer surface,
      a second outer surface and a first thickness,
   wherein said panel is made of said padding layer with no further layers of a different material between said first outer surface and said second outer surface,
   wherein said padding layer in at least one portion (P) of panel has a variable density in a direction transverse to the first and second outer surfaces, said density being higher in proximity of said first and second outer surfaces thereof and being lower in proximity of its innermost layer;
   wherein said padding layer is configured to comprise an edge with a second thickness which is smaller than the first thickness, the edge extending along an entire perimeter of said panel;
      wherein the first outer surface and the second outer surface are symmetrical in the transverse direction from the at least one portion to the edge of the panel;
   wherein said panel has a transition thickness between said first thickness and said second thickness; and
   wherein said transition thickness increases with a continuously increasing progression from the second thickness to the first thickness upon an increase in the distance from the edge, so that the panel is outwardly convex in the transition from the second thickness to the first thickness.

2. The sound-absorbing panel according to claim 1, wherein said density in proximity of said first outer surface is substantially as said density in proximity of said second outer surface.

3. The sound-absorbing panel according to claim 1, wherein, in said at least one portion (P) of said panel, the weight of an outer layer having a thickness of about 10% of said first thickness is between about 20% and 30% of the weight of the panel in said at least one portion (P).

4. The sound-absorbing panel according to claim 1, wherein, in said at least one portion (P) of said panel, the weight of an outer layer having a thickness of about 20% of said first thickness is between about 25% and 45% of the weight of the panel.

5. The sound-absorbing panel according to claim 1, further comprising a first layer of fabric facing said first outer surface of said padding layer and a second layer of fabric facing said second outer surface of said padding layer.

6. The sound-absorbing panel according to claim 1, wherein the second thickness (SP2) is between about 5% and about 20% of said first thickness (SP1) measured at a central location (P) of said panel.

7. The sound-absorbing panel according to claim 1, wherein said edge has a density substantially as, or higher than, the density in proximity of said first and second outer layers.

8. The sound-absorbing panel according to claim 1, wherein said heat-bonded synthetic fibers comprise polyester fibers.

9. The sound-absorbing panel according to claim 5, which further comprises an adhesive layer arranged between said first and second outer surfaces of the padding layer and each of said layers of fabric.

10. The sound-absorbing panel according to claim 1, comprising one or more depressions having a thickness smaller than the first thickness.

11. The sound-absorbing panel according to claim 10, wherein said one or more depressions comprise one or more holes for fixing members.

12. The sound-absorbing panel according to claim 1, comprising fins configured to penetrate into holes of a support frame.

13. A method for manufacturing a sound-absorbing panel, comprising:
   a) providing a padding layer comprising heat-bonded synthetic fibers, wherein said padding layer comprises a first outer surface and a second outer surface and has an initial thickness, wherein, in at least one portion (P) of said panel, said panel is made of said padding layer with no further layers of a different material between said first outer surface and said second outer surface;
   b) treating said padding layer so that:
      the at least one portion (P) changes from the initial thickness to a first thickness and so that, in said at least one portion of the panel (P), said panel has a variable density in a direction transverse to the first and second outer surfaces, said density being higher in proximity of said first and second outer layers thereof and being lower in proximity of its innermost layer;
      said padding layer is configured to comprise an edge with a second thickness which is smaller than the first thickness, the edge extending along an entire perimeter of said panel; and
      the first outer surface and the second outer surface are symmetrical in the transverse direction from the at least one portion to the edge of the panel;
   wherein said panel has a transition thickness between said first thickness and said second thickness; and
   wherein said transition thickness increases with a continuously increasing progression from the second thickness to the first thickness upon an increase in the distance from the edge, so that the panel is outwardly convex in the transition from the second thickness to the first thickness.

14. The method according to claim 13, wherein said treatment step comprises:
   c) laying a first layer of fabric facing said first outer surface of said padding layer and a second layer of fabric facing said second outer surface of said padding layer;

d) pre-heating said padding layer;

e) forming said padding layer by exerting a pressure on said padding layer associated with the first and second layers of fabric at least in a portion of the perimeter of said panel so that the thickness of the padding layer changes, at least in said portion of the panel (P), from the initial thickness to a first thickness.

15. The method according to claim 13, further comprising one or more of the following:

f) depositing an adhesive layer between said padding layer and each of said layers of fabric;

g) shaping the edge in order to finish the ends of said edges; and h) drilling at least one hole where at least one depression with a reduced thickness is present.

16. The sound-absorbing panel according to claim 1, wherein said transition thickness increases from the second thickness to the first thickness with a substantially logarithmic progression upon the increase in the distance from the edge.

17. The sound-absorbing panel according to claim 1, wherein the second thickness is between 2 mm and 7 mm.

18. The sound-absorbing panel according to claim 1, wherein the density of the padding layer at the edge is between 350 $Kg/m^3$ and 900 mm $Kg/m^3$.

19. The method according to claim 13, wherein said transition thickness increases from the second thickness to the first thickness with a substantially logarithmic progression upon the increase in the distance from the edge.

20. The method according to claim 13, wherein the second thickness is between 2 mm and 7 mm.

21. The method according to claim 13, wherein the density of the padding layer at the edge is between 350 $Kg/m^3$ and 900 mm $Kg/m^3$.

* * * * *